US012811794B2

(12) United States Patent
Yeo et al.

(10) Patent No.: US 12,811,794 B2
(45) Date of Patent: Nov. 24, 2026

(54) BIOMETRIC TEMPLATE SECRET SHARING

(71) Applicant: Seagate Technology LLC, Fremont, CA (US)

(72) Inventors: Foo Yee Yeo, Shugart (SG); Jason Hwei Ming Ying, Shugart (SG)

(73) Assignee: Seagate Technology LLC, Fremont, CA (US)

( * ) Notice: Subject to any disclaimer, the term of this patent is extended or adjusted under 35 U.S.C. 154(b) by 45 days.

(21) Appl. No.: 18/973,387

(22) Filed: Dec. 9, 2024

(65) Prior Publication Data

US 2026/0163740 A1 Jun. 11, 2026

(51) Int. Cl.

| | |
|---|---|
| ***H04L 9/32*** | (2006.01) |
| ***G06F 21/31*** | (2013.01) |
| ***G06F 21/32*** | (2013.01) |
| ***G06V 40/50*** | (2022.01) |
| ***H04L 9/08*** | (2006.01) |

(52) U.S. Cl.

CPC ............ *H04L 9/3231* (2013.01); *G06V 40/50* (2022.01); *H04L 9/085* (2013.01); *G06F 21/31* (2013.01); *G06F 21/32* (2013.01)

(58) Field of Classification Search

CPC ....... H04L 9/3231; H04L 9/085; G06V 40/50; G06F 21/31; G06F 21/32

USPC ........................................................ 713/186

See application file for complete search history.

(56) References Cited

U.S. PATENT DOCUMENTS 6,697,947 B1 * 2/2004 Matyas, Jr. ........... H04L 9/3247 713/180
8,135,180 B2 * 3/2012 Baltatu .................. G06V 10/94 713/186
10,505,723 B1 * 12/2019 Griffin .................... H04L 9/085
11,928,240 B2 * 3/2024 Richmond .......... G06F 21/6218
2015/0095654 A1 * 4/2015 Li ......................... H04L 9/0866 713/186
2015/0207630 A1 * 7/2015 Shimoyama ..... G06Q 20/40145 713/186

(Continued)

OTHER PUBLICATIONS

Wang, "Privacy-Preserving Fingerprint Authentication Using D-H Key Exchange and Secret Sharing", Nov. 27, 2021, *Research Article*, vol. 2021, Article ID 5344696, 12 pages.

(Continued)

*Primary Examiner* — Thanh T Le
(74) *Attorney, Agent, or Firm* — Mueting Raasch Group

(57) ABSTRACT

Described are methods for protecting biometric templates using secret sharing in such a way that authentication can be performed without reconstruction of the biometric template. This can help protect against the security and privacy risks of storing biometric templates. Accordingly, the described methods use k-out-of-n secret sharing to distribute the template to some a number of parties, and when a user wishes to authenticate, k shares of a newly generated input template (produced from input biometrics) may be distributed by additive secret sharing to k parties. Each party computes a parameter based on its share of the biometric template and the input template without receiving any information about the other shares. The parameters are combined in a way that produces a Hamming distance, which may be compared to an authentication threshold to determine authenticity of the input.

17 Claims, 2 Drawing Sheets

(56) References Cited

U.S. PATENT DOCUMENTS

| | | | | |
|---|---|---|---|---|
| 2019/0116180 | A1* | 4/2019 | Teranishi | G06F 21/32 |
| 2019/0229894 | A1* | 7/2019 | Samid | H04L 9/085 |
| 2019/0311096 | A1* | 10/2019 | Eldefrawy | G06F 21/32 |
| 2019/0312731 | A1* | 10/2019 | Eldefrawy | H04L 9/085 |
| 2020/0259651 | A1* | 8/2020 | Mohassel | H04L 9/3218 |
| 2021/0243026 | A1* | 8/2021 | Mohassel | H04L 9/085 |
| 2022/0058248 | A1* | 2/2022 | Cohen | G06V 40/11 |
| 2022/0327189 | A1* | 10/2022 | Belli | G06F 21/32 |
| 2022/0329591 | A1* | 10/2022 | Hua | H04L 63/0815 |
| 2022/0405363 | A1* | 12/2022 | Williams | G06F 3/165 |
| 2023/0050481 | A1* | 2/2023 | Nagaraja | H04L 9/0643 |
| 2023/0147493 | A1* | 5/2023 | Pandian | G06F 21/32 726/26 |
| 2025/0211429 | A1* | 6/2025 | Wang | H04L 9/085 |
| 2025/0293863 | A1* | 9/2025 | Lin | H04L 9/085 |
| 2025/0337737 | A1* | 10/2025 | Nishida | G06F 21/60 |
| 2025/0350595 | A1* | 11/2025 | Fukuda | G07C 9/37 |

OTHER PUBLICATIONS

Malkin, "Summary of Lecture on Secret Sharing", *COMS W4261: Introduction to Cryptography*, Dec. 3, 2019, 5 pages.

Hofmeister, "Contrast-optimal k out of n secret sharing schemes in visual cryptography", 2000, *Theoretical Computer Science*, 240, 471-485.

Sardar, "A Novel Cancelable FaceHashing Technique Based on Non-Invertible Transformation With Encryption and Decryption Template", May 20, 2020, *Digital Object Identifier*, vol. 8, 10.1109/Access.2020.2999656, 15 pages.

Mai, "On the Reconstruction of Face Images from Deep Face Templates", Apr. 29, 2018, 15 pages.

Venugopalan, "How to Generate Spoofed Irises From an Iris Code Template", Jun. 2011, *IEEE Transactions on Information Forensics and Security*, vol. 6, No. 2, 11 pages.

Jin, "Ranking-Based Locality Sensitive Hashing-Enabled Cancelable Biometrics: Index-of-Max Hashing", Feb. 2018, *IEEE Transactions on Information Forensics and Security*, vol. 13, No. 2, 15 pages.

Manvi, "SIAN: Secure Iris Authentication using Noise", 2022, *IEEE International Joint Conference on Biometrics*, 9 pages.

Kim, "Reconstruction of Fingerprints from Minutiae Using Conditional Adversarial Networks", 2019, *School of Information and Communication Engineering*, LNCS 11378, pp. 353-362.

Cao, "Learning Fingerprint Reconstruction: From Minutiae to Image", Jan. 2015, *IEEE Transactions on Information Forensics and Security*, vol. 10, No. 1, 14 pages.

Cappelli, "Fingerprint Image Reconstruction from Standard Templates", Sep. 2007, *IEEE Transactions on Pattern Analysis and Machine Intelligence*, vol. 29, No. 9, 15 pages.

Adler, "Sample Images can be Independently Restored from Face Recognition Templates", 2003, *School of Information Technology and Engineering—CCECE 2003-CCGEI 2003*, 4 pages.

Galbally, "Iris image reconstruction from binary templates: An efficient probabilistic approach based on genetic algorithms", 2013, *Computer Vision and Image Understanding*, 117, pp. 1512-1525.

Abdullahi, "Biometric template attacks and recent protection mechanisms: A survey" 2024, *Information Fusion*, 103, 102144, 28 pages.

Cappelli, "Can Fingerprints be Reconstructed from ISO Templates?" 2006, *Biometric System Laboratory—DEIS—IEEE*, 6 pages.

* cited by examiner

BIOMETRIC TEMPLATE SECRET SHARING

TECHNICAL FIELD

The disclosure relates to protecting biometric authentication data using secret sharing techniques.

SUMMARY

In accordance with certain aspects, the present disclosure describes methods for authenticating biometric input against a stored biometric template that is shared among n parties in accordance with a k-out-of-n secret sharing scheme such that each party has a different share of the stored biometric template, and where k and n are integers and k is less than or equal to n. Such methods include generating an input template from the biometric input, generating k shares of the input template using an additive secret sharing scheme, providing each one of the k shares of the input template to a different one of k parties out of the n parties, and without reconstructing the stored biometric template, determining a Hamming distance between the input template and the stored biometric template. The Hamming distance may then be compare to an authentication threshold. Determining the Hamming distance may be performed by a dedicated reconstructor/authenticator party.

In certain aspects, the biometric input may be data related to fingerprints, finger veins, facial features, or irises from an eye. In certain aspects, the biometric input may be data related to unique physical features of a physical object (such as intended or unintended identifying markings), or may be data related to unique digital characteristics of a digital asset.

In certain aspects, the biometric input may be produced from optical sensors, capacitive sensors, or ultrasonic sensors.

In accordance with certain aspects, the present disclosure describes methods for authenticating biometric input that may include the steps of enrolling obtained biometric data as a stored biometric template in accordance with a k-out-of-n Shamir's secret sharing scheme, obtaining biometric user input data for authentication, generating an input template from the biometric user input data, providing each of k shares of the input template to a different one of k parties using an additive secret sharing scheme, each of the k parties having a corresponding share of the stored biometric template, for each of the respective k parties, calculating a parameter using that party's share of the input template and that party's share of the stored biometric template, and determining a Hamming distance using the calculated parameters.

In accordance with certain aspects, the present disclosure describes methods for authenticating biometric input that may include the steps of enrolling obtained biometric data as a stored biometric template in accordance with a k-out-of-n secret sharing scheme, obtaining biometric user input data for authentication, generating an input template from the biometric user input data, and without reconstructing the stored biometric template, using k shares of the stored biometric template and k shares of the input template to determine authenticity of the biometric input.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
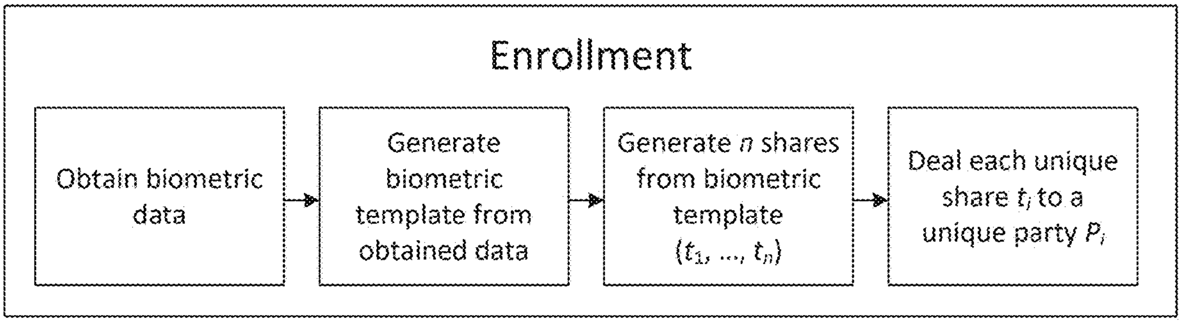
FIG. 1 is a flow chart illustrating a biometric template enrollment process in accordance with certain aspects of the present disclosure.

The present disclosure relates to protecting biometric templates using secret sharing in such a way that authentication can be performed without reconstruction of the template. Storing biometric templates can pose security and privacy risks due to the existence of known methods for biometric template reconstruction. In accordance with the present disclosure, this can be addressed by using secret sharing to distribute the template to some a number of parties in a way that no party learns information about the template from the other parties and the template is not reconstructed. In accordance with various aspects, k-out-of-n secret sharing (such as Shamir's secret sharing) may be used to distribute shares of a stored biometric template to n parties. When a user wishes to authenticate, k shares of an input template that is newly generated from input biometrics may be distributed to any k of the n parties. This may be performed using an additive secret sharing scheme. The k parties may use their shares of the stored biometric template and the shares of the newly generated input template to authenticate the user without the need to reconstruct the original template.

Biometric templates for use in authentication may be produced from processed images, or other sensor data, generated from a user's uniquely identifiable bodily characteristics such as fingerprints, finger veins, facial features, the iris of an eye, and so forth. Suitable sensors may include optical sensors, capacitive sensors, ultrasonic sensors, or any other type of sensor useful for capturing biometric data now known or later developed. In accordance with the present disclosure, it is recognized that authentication may not be limited to biometric data from a human, and may also be used to verify objects or devices from their unique physical characteristics (such as scratches, markings, and the like, whether present intentionally or unintentionally) that may be used for identification, as well as from digital signatures. As such, as used herein the term "biometric" refers to any unique physical or digital characteristic that can be represented and stored as data bits in a template to thereby uniquely identify, verify, or authenticate a person, an object, or a digital asset.

Biometric systems typically store biometric templates during an enrollment process which can be used as a reference source for authentication when the same user (or an imposter) presents corresponding biometrics at a later instance. However, storing full biometric templates can pose security and privacy risks due to known methods of biometric template reconstruction, such as for fingerprint templates, facial templates, and iris templates. Some attempts to prevent attacks on biometric templates can result in reduction of accuracy. Other attack prevention methods use RSA encryption to achieve non-invertibility of facial templates, which relies on the secure storage of a secret key. In yet other methods, templates are secured at the additional computational cost of using a secure two-party computation scheme. In accordance with the present disclosure, attacks seeking to steal biometric templates can be effectively prevented by using secret sharing during enrollment to protect the stored biometric template, and by using secret sharing during authentication in a way that does not expose template information to other parties involving in the secret sharing.

In accordance with various aspects of the present disclosure, secret sharing schemes may be used to distribute shares of a biometric template to several parties so that authentication can be performed without reconstruction of the biometric template. This protects the template even if some of the parties are compromised by an adversary. In accordance with certain aspects, k-out-of-n threshold secret sharing may be used, meaning that authentication can be carried out by any k out of the total n number of parties that hold shares of the template. An adversary that compromises k−1 or fewer parties learns no information about the template. Authentication involves secret sharing of a template generated from biometric input to any k out of the n parties, each of which may then perform a calculation based on the shares of the stored template and the input template that they hold. These individual calculations may be used to determine a Hamming distance that can be referenced to a threshold for authentication. In certain embodiments, a dedicated server may be used to perform the authentication.

In accordance with various aspects, the present disclosure provides methods of using secret sharing schemes to divide a stored biometric template obtained during a biometric enrollment process into n shares, and then provide each of those shares to a single one of n parties, namely $P_1, \ldots, P_n$, such that the Hamming distance between the stored biometric template and an input template generated from input provided during an authentication process can be computed without reconstructing the stored biometric template. As used herein, the phrase "reconstructing the stored biometric template" refers to fully or partially reconstructing a biometric template that was generated and stored in an enrollment process, or to otherwise providing information about one or more shares of a stored biometric template held by one party to another party. When comparing two different bit strings having the same length, the Hamming distance is the number of positions in which the bit strings differ. For example, the bit strings {00101} and {01001} have a Hamming distance of 2 since they differ in two positions (the second and third positions, counted from the left). In many biometric authentication use cases, the templates are bit strings of fixed length, and verifying the identity of the user involves computing the Hamming distance between the stored template and the newly generated template (also referred to herein as the input template).

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding and are not meant to be scale drawings that accurately represent size or shape of elements.

Figure 2:
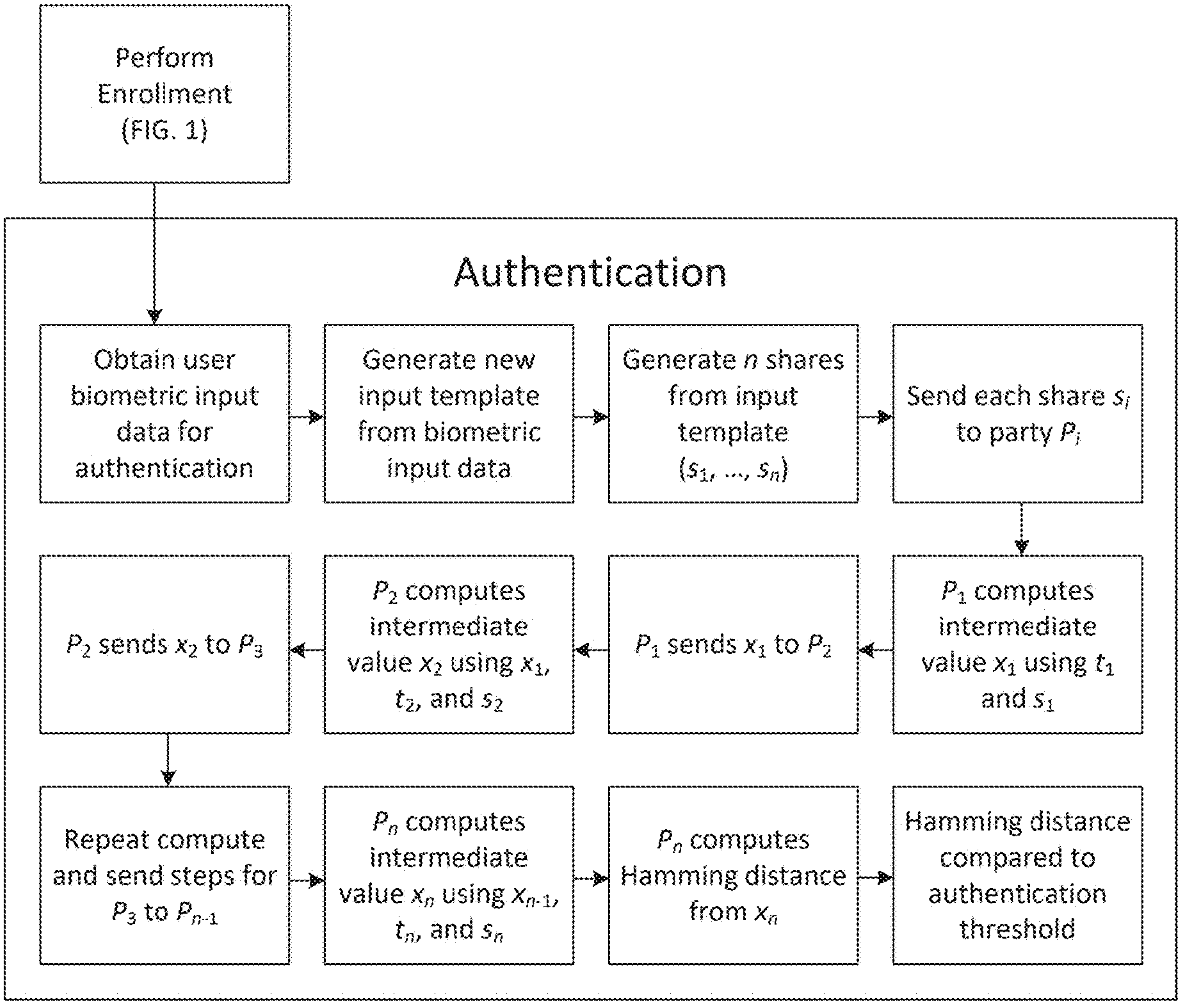
FIG. 2 is a flow chart illustrating a biometric input authentication process in accordance with certain aspects of the present disclosure.

FIG. 1 illustrates an enrollment process and FIG. 2 illustrates an authentication process for the simplest case, namely the n-out-of-n case (that is, the non-threshold case when k=n). In FIG. 1, enrollment takes place by first acquiring biometric data from a user such as a fingerprint, finger vein, iris image, face image, or images of unique features of a device or other physical object or digital asset. Biometric data may be acquired from optical sensors, capacitive sensors, ultrasonic sensors, or any other sensor for obtaining such data, as well as combinations thereof. Biometric data may also be generated by concatenation or other ways of combining the input from multiple images or sensor data. A template is generated from the acquired biometric data to convert the biometric data to a string of bits, preferably of a fixed length. The biometric template is then divided into n shares of equal bit length, and each different share is provided to a different one of n parties. The shares are dealt to the parties secretly so that no party has any information regarding the shares provided to any other party. This is called k-out-of-n secret sharing for the case where k=n. Throughout this document, the enrollment template is referred to as the "stored biometric template" or simply "biometric template."

FIG. 2 illustrates an authentication process in accordance with certain aspects of the present disclosure. After enrollment has been completed, a user may present biometric input data for authentication. The biometric input data is generally of the same type as what was acquired during enrollment. An input template is then generated from the biometric input data. From the input template, n shares are generated and shared with n parties in accordance with an additive secret sharing scheme. Each of the parties then computes an intermediate value, or parameter, from that party's ($P_i$) share of the stored biometric template ($t_i$) and share of the input template ($s_i$), along with any computed value received from a previous party. The computed parameter is then sent to the next party ($P_{i+1}$) for computation of another parameter. During this process, no party receives any information about any shares of the stored biometric template or about any shares of the input template from any other party. After the last party ($P_n$) computes the final parameter, the Hamming distance can be computed from the final parameter. When the Hamming distance is below a threshold amount, then authentication is verified. When the Hamming distance is greater than a threshold amount, then authentication is rejected.

As mentioned, FIG. 1 and FIG. 2 illustrate the non-threshold case of n-out-of-n secret sharing. For the more general case of k-out-of-n threshold secret sharing (that is, where k may be less than n), the enrollment process proceeds in a similar way with the biometric input being first converted to a template that is then shared among n parties $P_1, \ldots, P_n$ using a k-out-of-n Shamir's secret sharing scheme. During authentication of new biometric input against the stored biometric information, only k out of the n parties are required to be present. The new biometric data obtained from user input is converted to an input template. The input template is then shared among the k parties participating in the authentication process by using an additive secret sharing scheme, rather than by using Shamir's secret sharing. These k parties can then use their shares of the stored biometric template and their shares of the input template to jointly perform an authentication operation with a minimal amount of communication between the parties, and without reconstructing the stored biometric template.

In certain embodiments in accordance with the present disclosure, a single party may serve as a dedicated reconstructor/authenticator. Using a dedicated reconstructor/authenticator may provide even stronger security guarantees since an adversary can learn no information about the biometric template during the authentication process even if such adversary corrupts k−1 of the parties. Moreover, the dedicated reconstructor/authenticator only learns the Hamming distance between the stored biometric template and the input template, and nothing else.

Figure 3:
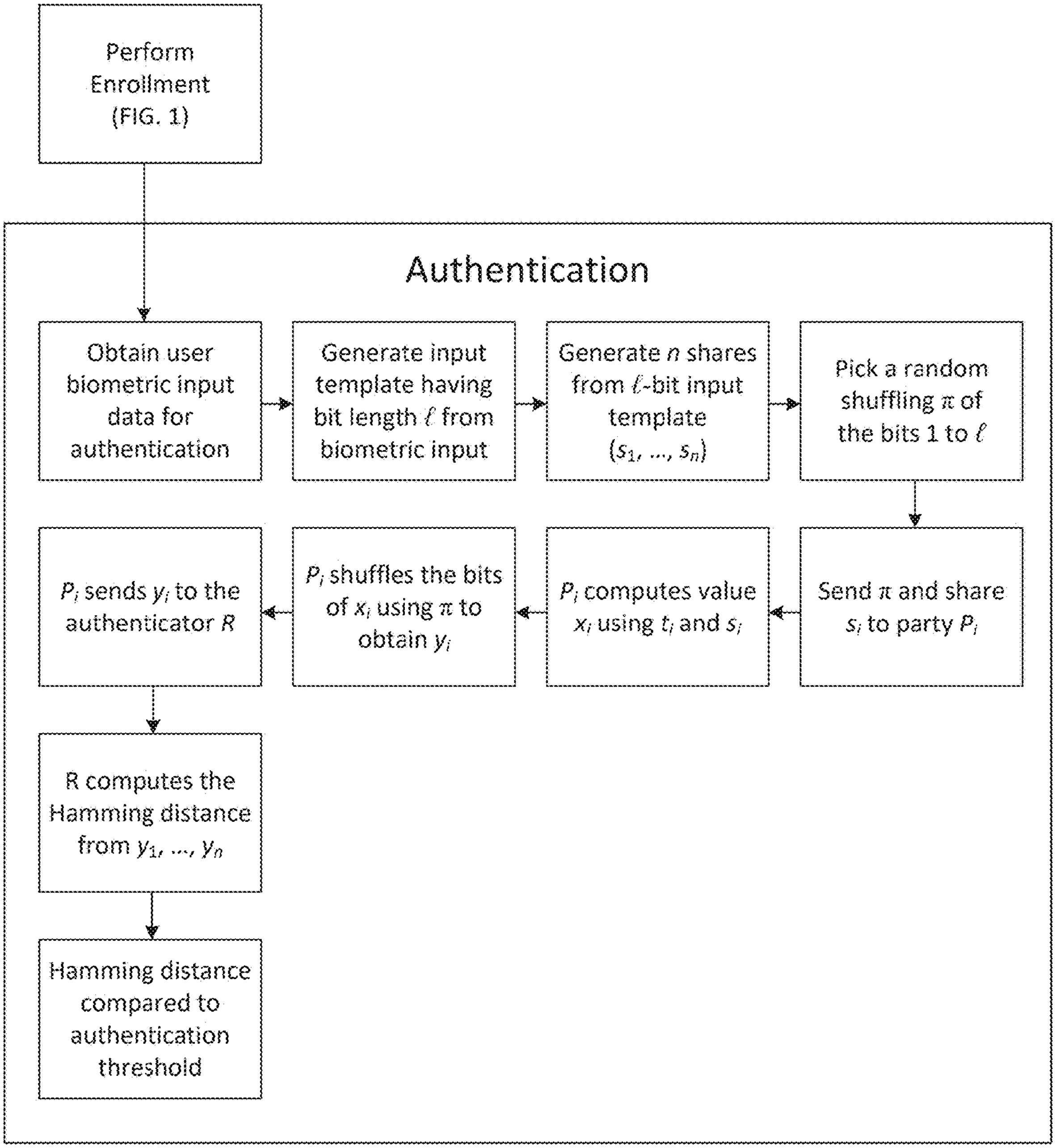
FIG. 3 is a flow chart illustrating a biometric input authentication process utilizing a dedicated reconstructor/authenticator party in accordance with certain aspects of the present disclosure.

FIG. 3 illustrates the authentication process for a dedicated reconstructor/authenticator R in the simple n-out-of-n non-threshold case. In this case, the authentication process works slightly differently than what is shown in FIG. 2. Upon obtaining biometric input data for authentication, an input template is generated, as usual. The input template has a fixed bit length $\ell$ A number n of shares are then generated from the input template. Next, a random shuffling of the bit order, from 1 to $\ell$ is selected, and that randomly shuffled order is sent along with a share of the input template to a corresponding one of the parties. Each party ($P_i$) computes a parameter ($x_i$) based on a comparison between its share of the stored biometric template ($t_i$) and its share of the input template ($s_i$). The bits of the computed parameter are then shuffled according to the random shuffling order that was sent to the party, thus obtaining a permuted parameter ($y_i$). The reconstructor R then receives all of the permuted parameters $y_1, \ldots, y_n$, and computes the Hamming distance therefrom.

EXAMPLES

As a first example, in certain embodiments involving the case of a k-out-of-n threshold scheme without using a dedicated reconstructor or authenticator, enrollment and authentication processes may proceed as follows. Suppose that there are n parties $P_1, \ldots, P_n$, that the desired threshold is k, and that the template is an $\ell$ bit string. Consider the finite field F= $\mathbb{F}_{2^\ell}$ with elements $2^\ell$ and assume that $2^\ell$ is greater than n. Fix an injection, ι: {1, . . . , n}→F*. For the authentication process, assume that k parties participate, $P_{m_1}, \ldots, P_{m_k}$.

Example 1A, Enrollment

1. Preprocess the user input.
2. Run the template generation algorithm on the preprocessed input to generate a template t.
3. Pick a random polynomial p(X) of degree less than or equal to k−1 such that p(0)=t uniformly. The template is an $\ell$-bit string and hence can be interpreted as an element of F.
4. Divide the template t into shares $t_1=p(\iota(1)), \ldots, t_n=p(\iota(n))$, and for each i=1, . . . , n, send the template share $t_i$ to $P_i$.

Example 1B, Authentication

1. Preprocess the user input.
2. Run the template generation algorithm on the preprocessed user input to generate a template s.
3. Generate shares $s_1, \ldots, s_k$ of s using additive secret sharing.
4. For each i=1, . . . , k, send $s_i$ to $P_{m_i}$.
5. Solve the following system of linear equations to find $\alpha_1, \ldots, \alpha_k \in F$.

$$\alpha_1 + \ldots + \alpha_t = 1$$

$$\alpha_1 l(m_1) + \ldots + \alpha_k l(m_k) = 0$$

$$\alpha_1 l(m_1)^2 + \ldots + \alpha_k l(m_k)^2 = 0$$

$$\ldots$$

$$\alpha_1 l(m_1)^{t-1} + \ldots + \alpha_k l(m_k)^{t-1} = 0$$

6. $P_{m_1}$ computes $x_1=s_1+\alpha_1 t_1$ and sends $x_1$ to $P_{m_2}$.
7. For each i=2, . . . , k−1, $P_{m_i}$ computes $x_i=x_{i-1}+s_i+\alpha_i t_i$ and sends $x_i$ to $P_{m_{i+1}}$.
8. $P_{m_k}$ computes the Hamming weight of $x_k=x_{k-1}+s_k+\alpha_k t_k$.
9. If the Hamming weight is below a certain threshold, the authentication passes, otherwise the authentication fails.

As a second example, in certain embodiments involving the case of a k-out-of-n threshold scheme that utilizes a dedicated reconstructor or authenticator, enrollment and authentication processes may proceed as follows. Suppose that there are n parties $P_1, \ldots P_n$, that the desired threshold is k, and that the template is an $\ell$-bit string. Consider the finite field F= $\mathbb{F}_{2^\ell}$ with $2^\ell$ elements, and assume that $2^\ell$ is greater than n. Fix an injection, ι: {1, . . . , n}→F*. For the authentication process, assume that k parties participate, $P_{m_1}, \ldots, P_{m_k}$.

Example 2A, Enrollment

1. Preprocess the user input.
2. Run the template generation algorithm on the preprocessed input to generate a template t.
3. Pick a random polynomial p(X) of degree less than or equal to k−1 such that p(0)=t uniformly. The template is an $\ell$-bit string and hence can be interpreted as an element of F.
4. Divide the template t into shares $t_1=p(\iota(1)), \ldots, t_n=p(\iota(n))$, and for each i=1, . . . , n, send the template share $t_i$ to $P_i$.

Example 2B, Authentication

1. Preprocess the user input.
2. Run the template generation algorithm on the preprocessed user input to generate a template s.
3. Generate shares $s_1, \ldots, s_k$ of s using additive secret sharing.
4. Pick a random permutation π of the $\ell$ bits, represented by π: {1, 2, . . . , $\ell$}→{1, 2, . . . , $\ell$}.
5. For each i=1, . . . , k, send $s_i$ and π to $P_{m_i}$.
6. Solve the following system of linear equations to find $\alpha_1, \ldots, \alpha_k \in F$.

$$\alpha_1 + \ldots + \alpha_t = 1$$

$$\alpha_1 l(m_1) + \ldots + \alpha_k l(m_k) = 0$$

$$\alpha_1 l(m_1)^2 + \ldots + \alpha_k l(m_k)^2 = 0$$

$$\ldots$$

$$\alpha_1 l(m_1)^{t-1} + \ldots + \alpha_k l(m_k)^{t-1} = 0$$

7. For each $i=1, \ldots, k$, $P_{m_i}$ computes $x_i=s_i+\alpha_i t_i$, permutes the bits of $x_i$ using $\pi$ to obtain $y_i$, and sends $y_i$ to the dedicated reconstructor R.
8. R computes the Hamming weight by summing all $y_i$ from $i=1$ to k.
9. If the Hamming weight is below a certain threshold, the authentication passes, otherwise the authentication fails.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (for example, all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

All scientific and technical terms used herein have meanings commonly used in the art unless otherwise specified. The definitions provided herein are to facilitate understanding of certain terms used frequently herein and are not meant to limit the scope of the present disclosure.

As used herein, the term "configured to" may be used interchangeably with the terms "adapted to" or "structured to" unless the content of this disclosure clearly dictates otherwise.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality.

As used herein, any term related to position or orientation, such as "proximal," "distal," "end," "outer," "inner," and the like, refers to a relative position and does not limit the absolute orientation of an embodiment unless its context of usage clearly dictates otherwise.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. A method for authenticating biometric input against a stored biometric template that is shared among n parties in accordance with a k-out-of-n secret sharing scheme such that each party has a different share of the stored biometric template, and where k and n are integers and k is less than or equal to n, the method comprising:

obtaining biometric input data from at least one biometric sensor;

generating, from the biometric input data, an input template comprising an l-bit string;

generating k shares of the input template using an additive secret sharing scheme;

selecting a random permutation x of bit positions of the l-bit string;

providing each one of the k shares of the input template and the random permutation $\pi$ to a different one of k parties out of the n parties, each of the k parties having a corresponding share of the stored biometric template;

for each respective party of the k parties, computing a parameter based on the respective party's share of the input template and the respective party's share of the stored biometric template, and permuting bits of the parameter according to the random permutation $\pi$ to obtain a permuted parameter;

sending the permuted parameters from the k parties to a dedicated reconstructor/authenticator party;

without reconstructing the stored biometric template, determining, by the dedicated reconstructor/authenticator party, a Hamming distance between the input template and the stored biometric template using the permuted parameters; and comparing the Hamming distance to an authentication threshold.

2. The method of claim 1, wherein the biometric input comprises data related to fingerprints, finger veins, facial features, or irises from an eye.

3. The method of claim 1, wherein the biometric input comprises data related to unique physical features of a physical object.

4. The method of claim 3, wherein the unique physical features include intended markings.

5. The method of claim 3, wherein the unique physical features include scratches, imperfections, or other unintended markings.

6. The method of claim 1, wherein the biometric input comprises data related to unique digital characteristics of a digital asset.

7. The method of claim 1, wherein the biometric input is produced from optical sensors, capacitive sensors, or ultrasonic sensors.

8. The method of claim 1, further comprising determining that the biometric input is authentic when the Hamming distance is less than the authentication threshold, and rejecting the biometric input as inauthentic when the Hamming distance is greater than the authentication threshold.

9. The method of claim 1, wherein k is less than n, and the k-out-of-n secret sharing scheme is a Shamir's secret sharing scheme.

10. A method for authenticating biometric input, the method comprising:

obtaining biometric enrollment data from at least one biometric sensor:

generating, from the biometric enrollment data, a stored biometric template comprising an l-bit string;

enrolling the stored biometric template in accordance with a k-out-of-n Shamir's secret sharing scheme by selecting a polynomial p(X) of degree less than or equal to k−1 with p(0) equal to the stored biometric template and providing shares of the stored biometric template to n parties;

obtaining biometric user input data for authentication from at least one biometric sensor;

generating an input template from the biometric user input data;

generating k shares of the input template using an additive secret sharing scheme;

providing each of the k shares of the input template to a different one of k parties, each of the k parties having a corresponding share of the stored biometric template;

for each of the respective k parties, calculating a parameter using that party's share of the input template and that party's share of the stored biometric template;

determining, without reconstructing the stored biometric template, a Hamming distance using the calculated parameters; and comparing the Hamming distance to an authentication threshold to accept or reject the biometric user input data.

11. The method of claim 10, wherein the obtained biometric data and the biometric input comprise data related to unique features of a person, an object, or a digital asset.

12. The method of claim 10, wherein the obtained biometric data and the biometric input are produced from optical sensors, capacitive sensors, or ultrasonic sensors.

13. The method of claim 10, wherein the obtained biometric data and the biometric input are produced by concatenating data produced from multiple sensing events.

14. The method of claim 10, wherein determining a Hamming distance is performed by a dedicated reconstructor/authenticator party.

15. The method of claim 10, further comprising comparing the Hamming distance to an authentication threshold, accepting the biometric input as authentic when the Hamming distance is less than the authentication threshold, and rejecting the biometric input as inauthentic when the Hamming distance is greater than the authentication threshold.

16. A method for authenticating biometric input, the method comprising:

enrolling obtained biometric data as a stored biometric template in accordance with a k-out-of-n secret sharing scheme by dividing the stored biometric template into shares distributed among n parties;

obtaining biometric user input data for authentication from at least one biometric sensor;

generating, from the enrolled biometric data, the stored biometric template comprising an l-bit string;

enrolling the stored biometric template in accordance with a k-out-of-n Shamir's secret sharing scheme by selecting a polynomial p(X) of degree less than or equal to k−1 with p(0) equal to the stored biometric template and providing shares of the stored biometric template to n parties;

generating an input template from the biometric user input data;

generating k shares of the input template using additive secret sharing;

providing the k shares of the input template to k parties having corresponding shares of the stored biometric template;

causing the k parties to compute respective parameters from the k shares of the input template and the corresponding shares of the stored biometric template without any of the k parties receiving a share of the stored biometric template held by another party; and without reconstructing the stored biometric template, using the respective parameters to determine a Hamming distance and determine authenticity of the biometric input by comparing the Hamming distance to an authentication threshold.

17. The method of claim 16, wherein authenticity of the biometric input is determined by a dedicated authenticator party.

* * * * *